United States Patent
Kaneko et al.

(10) Patent No.: US 9,701,347 B2
(45) Date of Patent: Jul. 11, 2017

(54) VEHICLE BODY SIDE STRUCTURE

(71) Applicant: HONDA MOTOR CO., LTD., Tokyo (JP)

(72) Inventors: Kanji Kaneko, Wako (JP); Jun Ito, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/886,579

(22) Filed: Oct. 19, 2015

(65) Prior Publication Data
US 2016/0107700 A1 Apr. 21, 2016

(30) Foreign Application Priority Data

Oct. 21, 2014 (JP) .................................. 2014-214357

(51) Int. Cl.
*B62D 25/02* (2006.01)
*B62D 25/04* (2006.01)
*B62D 25/08* (2006.01)

(52) U.S. Cl.
CPC ........... *B62D 25/02* (2013.01); *B62D 25/025* (2013.01); *B62D 25/04* (2013.01); *B62D 25/087* (2013.01)

(58) Field of Classification Search
CPC ...... B62D 25/02; B62D 25/025; B62D 25/04; B62D 25/16
USPC ............... 296/187.12, 191, 193.05, 198, 208
See application file for complete search history.

(56) References Cited

U.S. PATENT DOCUMENTS

| 5,354,115 A * | 10/1994 | Esaki ................... B62D 25/025 296/187.12 |
| 5,443,297 A * | 8/1995 | Tanaka .................. B62D 25/02 296/203.03 |
| 2010/0207428 A1* | 8/2010 | Fukushima ........... B62D 25/02 296/203.03 |

FOREIGN PATENT DOCUMENTS

| DE | 102006015406 A1 * | 10/2007 | ........... B62D 21/157 |
| JP | 10-167115 A | 6/1998 | |

OTHER PUBLICATIONS

English Translation of DE 10 2006 015 406; retreived Nov. 15, 2016 via PatentTranslate located at www.epo.org.*

* cited by examiner

*Primary Examiner* — Jason S Daniels
(74) *Attorney, Agent, or Firm* — Westerman, Hattori, Daniels & Adrian, LLP

(57) ABSTRACT

A vehicle body side structure includes an outer panel which includes a side sill outer part and a center pillar outer part, a rear fender which is overlapped the outside of the outer panel, an inner panel which is mounted on the vehicle cabin side of the outer panel and a stiffener. The center pillar outer part includes an inclined part which is inclined backward and upward. The inner panel and the stiffener include an inner protrusion and a stiffener protrusion, respectively, which protrude backward and downward from the inclined part. A lower end of the rear fender is joined to the inner protrusion and the stiffener protrusion.

11 Claims, 10 Drawing Sheets

VEHICLE BODY SIDE STRUCTURE

CROSS REFERENCES TO RELATED APPLICATIONS

The present application claims priority under 35 U.S.C. §119 to Japanese Patent Application No. 2014-214357, filed Oct. 21, 2014, entitled "Vehicle Body Side Structure." The contents of this application are incorporated herein by reference in their entirety.

TECHNICAL FIELD

The present disclosure relates to vehicle body side structure.

BACKGROUND

As described in Japanese Patent Unexamined Patent Application Publication No. 10-167115, there is a conventional vehicle body structure in which a body side outer 1 is divided by a front side body side outer 2 and a rear fender 3 into front and back parts, and a center pillar outer 9 of the rear fender 3 is fitted on a center pillar reinforce 8 of the front side body side outer 2 to form an integrated structure. In this vehicle body structure, the front side body side outer 2 and the rear fender 3 are formed by a steel sheet having different plate thicknesses and made of different materials. For example, the front side body side outer 2 is formed by a thick and high-strength steel sheet to ensure impact resistance and the rear fender 3 is formed by a thin steel sheet to reduce the weight.

According to the above conventional vehicle body structure, when the center pillar is designed to be inclined backward and upward in accordance with a kick-up section which is inclined upward and backward from a rear end of a vehicle body floor, there is a problem of shortage of strength and rigidity if there is no area for connecting a lower end of the rear fender. That is, if there is no area for connecting the lower end of the rear fender to the lower area of the inclined part of the center pillar, there is a problem of shortage of strength and rigidity since the rear fender is formed by a thin plate in order to reduce the weight. As a result, providing a jack-up part and a component mounting section on the lower end of the rear fender also becomes difficult. An attempt has been made to overcome those problems. For example, an extension section which is downwardly extended from the inclined part of the center pillar may be integrally formed with the front side body side outer. However, this poses a problem that formability is deteriorated and weight is increased due to increased surface area since the front side body side outer is formed by a thick and high-strength steel sheet.

SUMMARY

The present application describes, for example, a vehicle body side structure capable of increasing the strength and rigidity of the rear fender while having a good formability of the outer panel and preventing increase in weight due to increased surface area in a vehicle designed to have a backwardly inclined center pillar.

(1) According to one aspect of the embodiment, a vehicle body side structure includes an outer panel that forms a design surface of a vehicle body side part and includes a side sill outer part and a center pillar outer part, a rear fender that forms a design surface on a rear side of the outer panel and is disposed so as to be overlapped on the outside of the side sill outer part and the center pillar outer part, and an indoor panel which is mounted on a vehicle cabin side of the outer panel, wherein the center pillar outer part includes an inclined part which is inclined backward and upward, the indoor panel includes a protrusion that protrudes backward and downward from the inclined part, and a lower end of the rear fender is joined to the protrusion of the indoor panel.

(2) In the vehicle body side structure described in the above (1), it is preferable that the indoor panel includes an inner panel which is mounted on the vehicle cabin side of the outer panel and forms a closed cross section and a stiffener which is interposed between the outer panel and the inner panel and partitions the closed cross section, the protrusion includes an inner protrusion formed on the inner panel and a stiffener protrusion formed on the stiffener, and the lower end of the rear fender is joined to the inner protrusion and the stiffener protrusion.

(3) In the vehicle body side structure described in the above (2), it is preferable that the side sill outer part has a cross section of a hat-like shape formed by a side sill outer cross sectional U-shaped part, a side sill outer upper flange which extends upward from the side sill outer cross sectional U-shaped part and a side sill outer lower flange which extends downward from the side sill outer cross sectional U-shaped part, the center pillar outer part has a cross section of a hat-like shape formed by a pillar cross sectional U-shaped part, a pillar front flange which extends forward from the pillar cross sectional U-shaped part and a pillar rear flange which extends backward from the pillar cross sectional U-shaped part, the inner protrusion includes an inner lower flange which is backwardly continuous from the side sill outer lower flange and an inner rear flange which is downwardly continuous from the pillar rear flange, the stiffener protrusion includes a stiffener lower flange which is backwardly continuous from the side sill outer lower flange and a stiffener rear flange which is downwardly continuous from the pillar rear flange, the rear fender includes a fender lower flange which is overlapped and joined to the inner lower flange and the stiffener lower flange, and a jack-up part is provided in a portion in which the inner lower flange, the stiffener lower flange and the fender lower flange are overlapped each other.

(4) In the vehicle body side structure described in the above (3), it is preferable that the stiffener protrusion includes a bead which extend upward from the jack-up part.

(5) In the vehicle body side structure described in the above (3) or (4), it is preferable that a pair of braces which extends forward from a rear vehicle body frame which is disposed on a rear side of the jack-up part is further provided, and a front end of each of the braces is mounted in the vicinity of the jack-up part.

(6) In the vehicle body side structure described in any one of the above (1) to (5), it is preferable that the indoor panel includes an inner panel that is mounted on the vehicle cabin side of the outer panel, the inner panel includes a side sill inner part and a center pillar inner part, the center pillar inner part is formed in a plate shape, the side sill inner part has a hat-like cross section formed by a side sill inner upper wall and a side sill inner lower wall which oppose to each other, a side sill inner side wall which connects vehicle-width inner ends of the side sill inner upper wall and the side sill inner lower wall, a side sill inner upper flange which extends upward from a vehicle-width outer end of the side sill inner upper wall, and a side sill inner lower flange which extends downward from a vehicle-width outer end of the side sill inner lower wall, and the side sill inner upper wall includes a gradually changing part having a width in a vehicle width direction which gradually decreases toward the center pillar inner part.

(7) In the vehicle body side structure described in the above (6), it is preferable that a stiffener which is interposed between the outer panel and the inner panel and partitions the closed cross section is further provided, and the stiffener forms a flat surface which is continuous from the plate-shaped center pillar inner part and is joined to a vehicle-width outside of the side sill inner part and forms a closed cross section.

According to the vehicle body side structure described in the above (1), even in a vehicle designed to have a backwardly inclined center pillar, the lower end of the rear fender can be joined to the indoor panel, thereby improving the strength and rigidity of the rear fender. Further, since there is no need of providing a special area on the outer panel for connecting the rear fender, it is possible to keep good formability of the outer panel and prevent increase in weight due to increased surface area even if the outer panel is formed by a thick and high-strength steel sheet.

According to the above (2), since the lower end of the rear fender is joined to the inner protrusion and the stiffener protrusion, three members are joined together as a whole, thereby further improving the strength and rigidity of the rear fender.

According to the above (3), since the jack-up part is disposed at a position in which the inner lower flange, the stiffener lower flange and the fender lower flange are overlapped each other, the strength and rigidity to an applied load during jacking-up can be improved.

According to the above (4), since the bead is provided, the strength and rigidity to an applied load during jacking-up can be further improved.

According to the above (5), since the load from the rear vehicle body frame can be transmitted to a vicinity of the jack-up part via a brace, vehicle body rigidity can be improved. Moreover, since the load applied to the jack-up part can be transmitted to the rear vehicle body frame via the brace, the strength and rigidity to an applied load during jacking-up can be further improved.

According to the above (6), since the center pillar inner part having a plate shape is provided, the load in the front-back direction and up-down direction can be transmitted along the surface of the plate shape, thereby improving load transmission efficiency and improving the rigidity and strength of vehicle body. Moreover, since the side sill inner part has a cross section of a hat-like shape, the closed cross section formed by combining the side sill inner part and the side sill outer part can be increased, thereby improving the rigidity and strength of a side sill as a whole formed by combining the side sill inner part and the side sill outer part. Since the side sill inner upper wall includes the gradually changing part, the center pillar inner part and the side sill inner part having different cross sectional shapes can be connected smooth to eliminate a stress concentrated portion, thereby improving load transmission efficiency.

According to the above (7), instead of the side sill inner part with a hat-like cross sectional shape, the stiffener can form a flat surface which is continuous to the center pillar inner part so that the load can be transmitted from the center pillar inner part to the flat surface in the front-back direction and up-down direction. Accordingly, the rigidity and strength of vehicle body can be improved by increasing load transmission efficiency.

BRIEF DESCRIPTION OF THE DRAWINGS

The advantages of the disclosure will become apparent in the following description taken in conjunction with the following drawings.

DETAILED DESCRIPTION

A vehicle body side structure according to one embodiment of the present disclosure will be described below with reference to the accompanying drawings.

Figure 1:
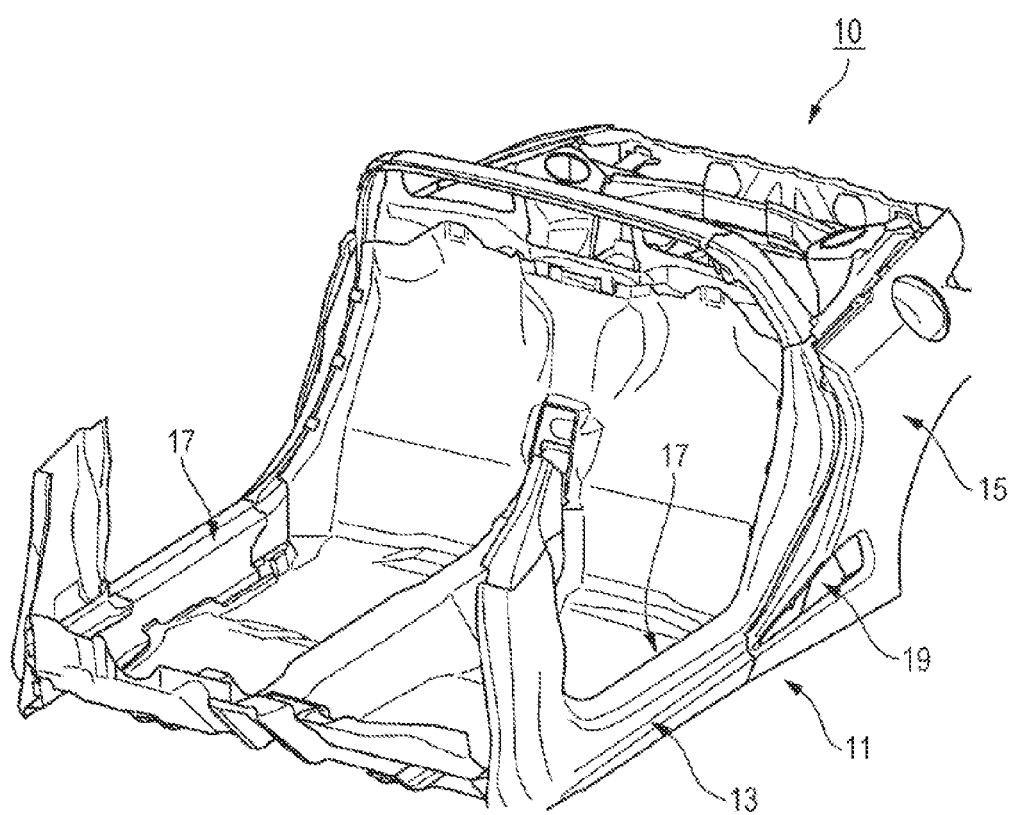
FIG. 1 is a perspective view of a vehicle body side structure according to an embodiment of the present disclosure as seen from an upper outside in a vehicle width direction.
Figure 2:
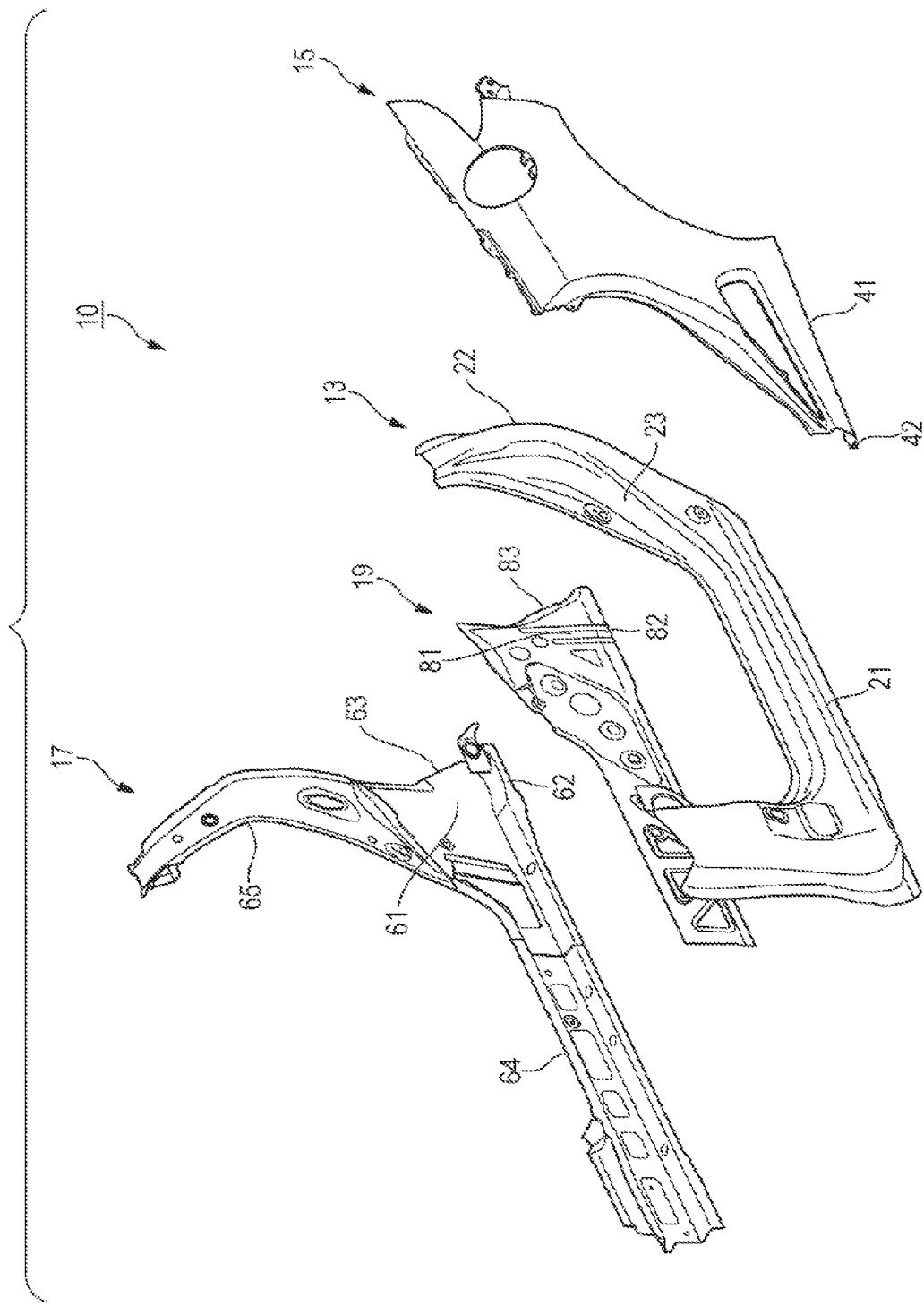
FIG. 2 is an exploded perspective view of a vehicle body side structure according to an embodiment of the present disclosure as seen from an upper outside in a vehicle width direction.
Figure 3:
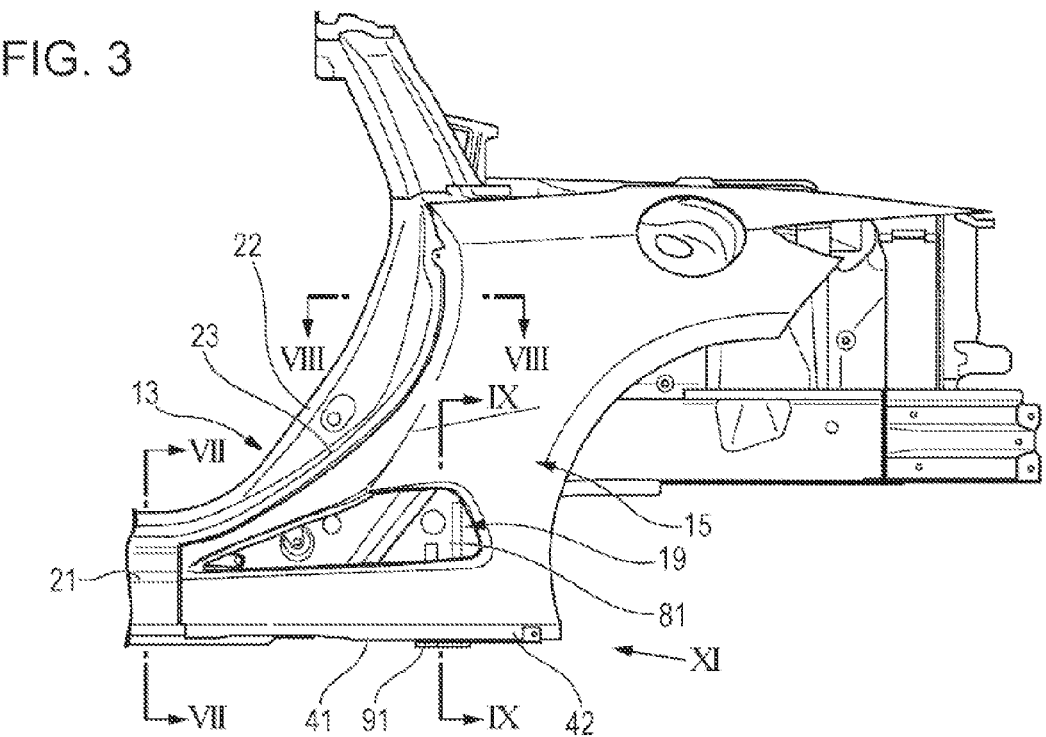
FIG. 3 is a side view of a vehicle body side structure according to an embodiment of the present disclosure as seen from an upper outside in a vehicle width direction.
Figure 4:
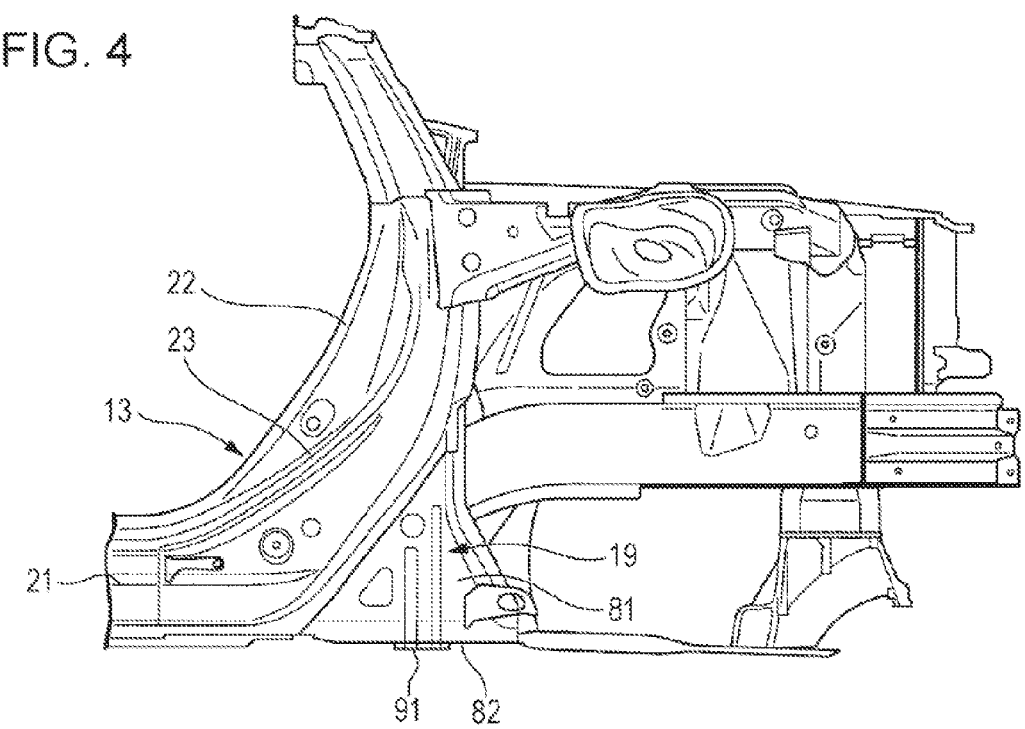
FIG. 4 is a side view of a vehicle body side structure according to an embodiment of the present disclosure as seen from an upper outside in a vehicle width direction without showing a rear fender.
Figure 5:
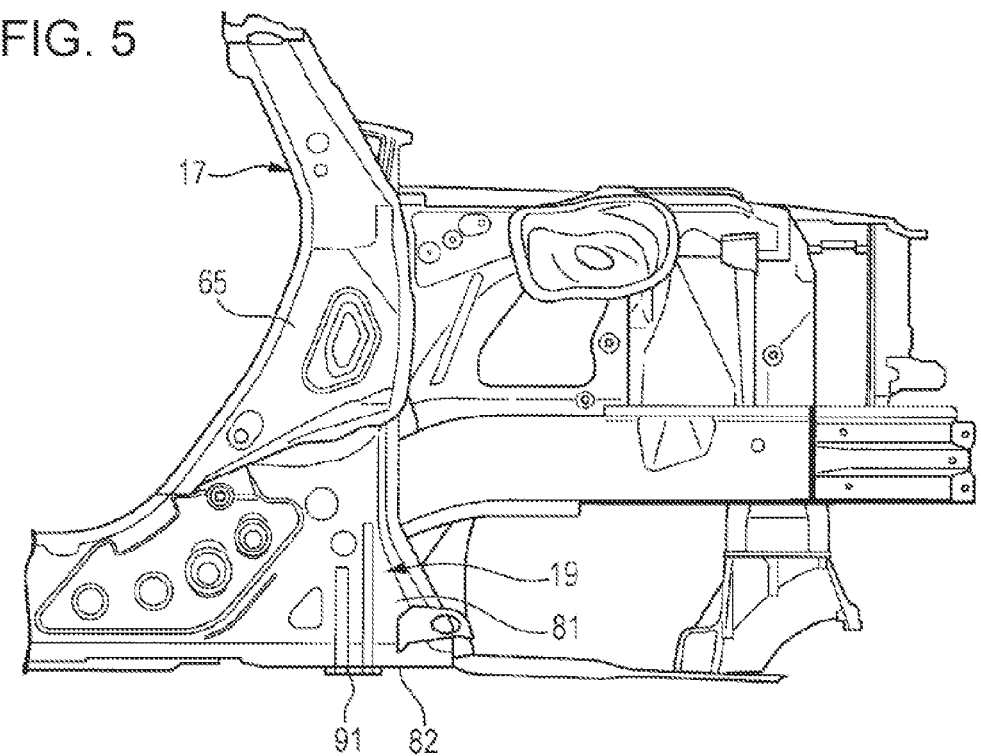
FIG. 5 is a side view of a vehicle body side structure according to an embodiment of the present disclosure as seen from an upper outside in a vehicle width direction without showing a rear fender and an outer panel.
Figure 6:
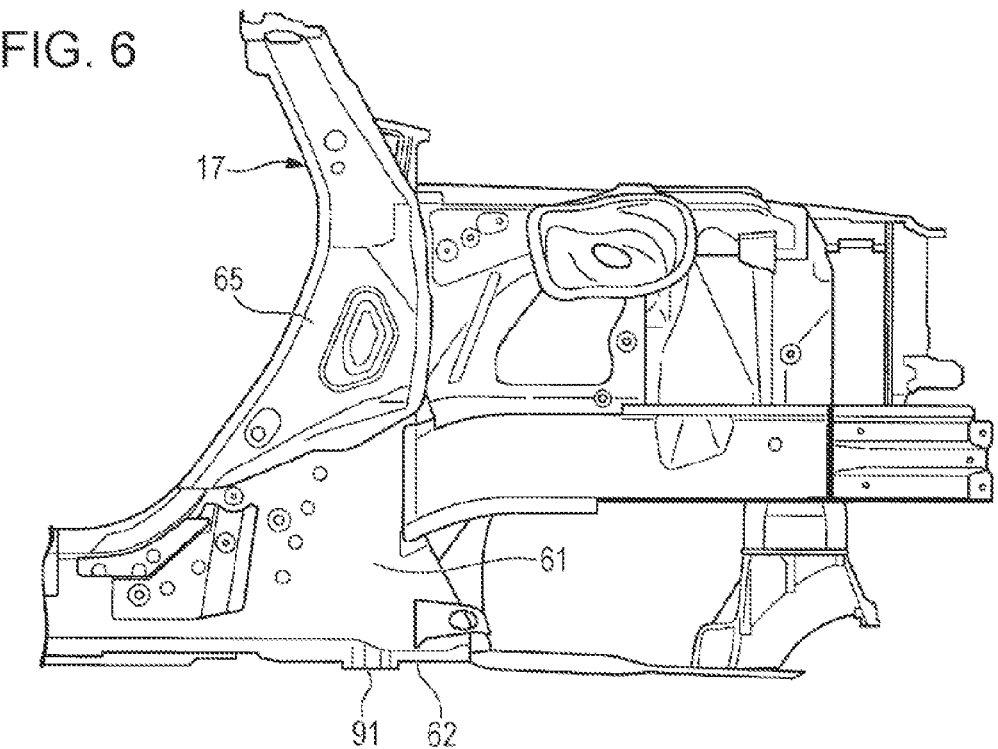
FIG. 6 is a side view of a vehicle body side structure according to an embodiment of the present disclosure as seen from an upper outside in a vehicle width direction without showing a rear fender, an outer panel and a stiffener.

As shown in FIGS. 1 and 2, a vehicle body side structure 10 according to the embodiment includes an outer panel 13 that forms a design surface of a vehicle body side part 11, a rear fender 15 that forms a design surface on a rear side of the outer panel 13, an inner panel 17 and a stiffener 19 which are disposed on a vehicle cabin side of the outer panel 13.

The outer panel 13 is made of a material such as a high-strength steel sheet. The outer panel 13 includes a side sill outer part 21 which extends in a vehicle body front-back direction and a center pillar outer part 22 which forms part of a vertical edge of a door opening. The center pillar outer part 22 includes an inclined part 23 which is inclined backward and upward from a rear end of the side sill outer part 21. The rear fender 15 is disposed so as to be overlapped on the outside of the side sill outer part 21 and the center pillar outer part 22.

The inner panel 17 is mounted on the vehicle cabin side of the outer panel 13 and forms a closed cross section. The inner panel 17 is provided with an inner protrusion 61 which protrudes backward and downward from the inclined part 23 of the side sill outer part 21. The stiffener 19 is interposed between the outer panel 13 and the inner panel 17 in the vehicle width direction and partitions the closed cross section formed by the inner panel 17 and the outer panel 13. The stiffener 19 is provided with a stiffener protrusion 81 which protrudes backward and downward from the inclined part 23 of the side sill outer part 21. As shown in FIGS. 3 to 6, a lower end 41 of the rear fender 15 is joined to the inner protrusion 61 and the stiffener protrusion 81.

Figure 7:
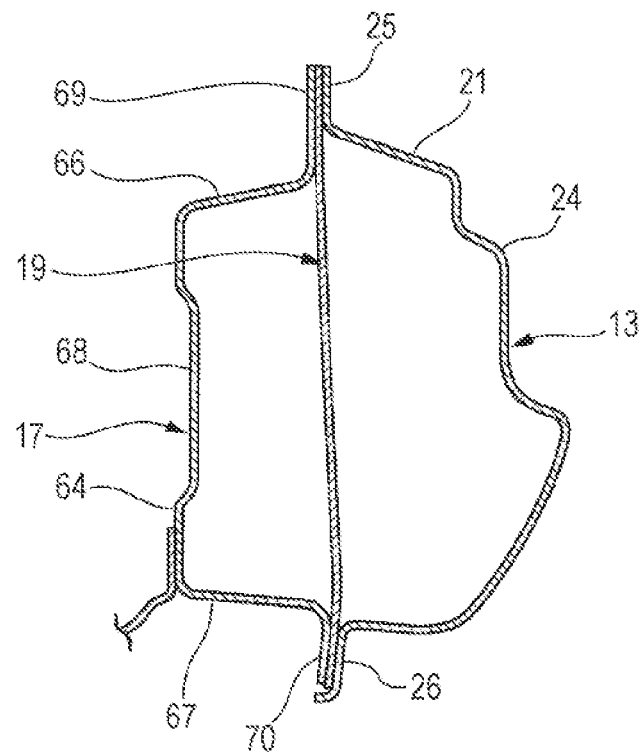
FIG. 7 is a cross sectional view taken along the line VII-VII of FIG. 3.

As shown in FIG. 7, the side sill outer part 21 includes a side sill outer cross sectional U-shaped part 24, a side sill outer upper flange 25 and a side sill outer lower flange 26 which extend upward and downward from the side sill outer cross sectional U-shaped part 24, respectively. The side sill outer part 21 has a cross section of a hat-like shape formed by the side sill outer cross sectional U-shaped part 24, the side sill outer upper flange 25 and the side sill outer lower flange 26.

Figure 8:
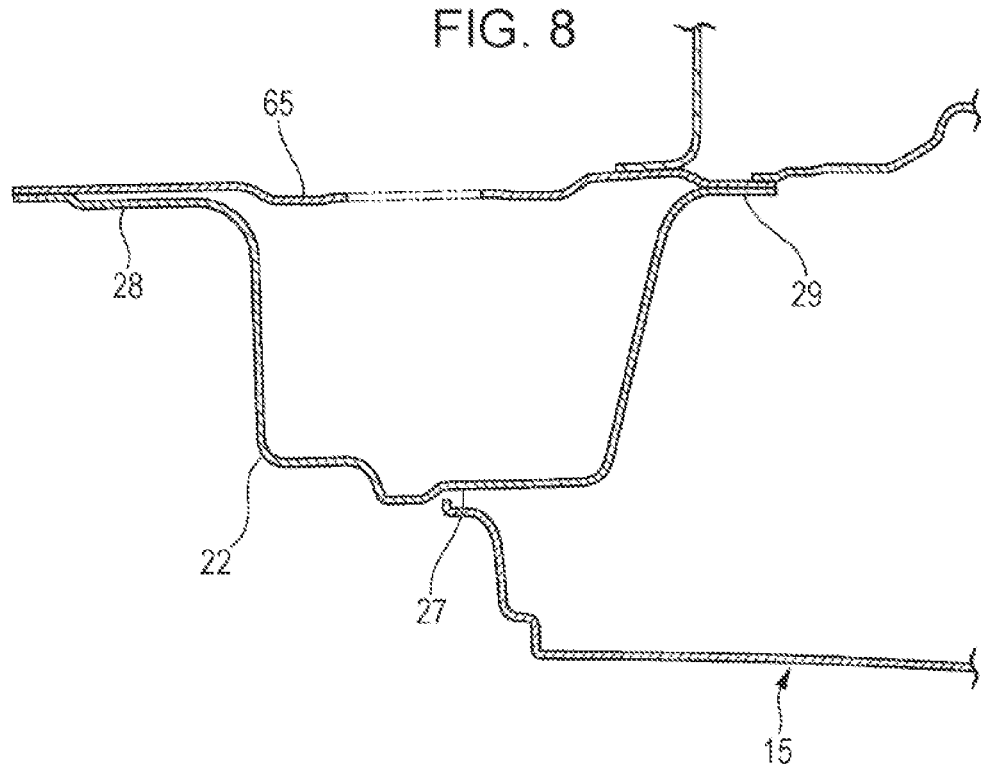
FIG. 8 is a cross sectional view taken along the line VIII-VIII of FIG. 3.

As shown in FIG. 8, the center pillar outer part 22 includes a pillar cross sectional U-shaped part 27, a pillar front flange 28 and a pillar rear flange 29 which extend forward and backward from the pillar cross sectional U-shaped part 27. The center pillar outer part 22 has a cross section of a hat-like shape formed by the pillar cross sectional U-shaped part 27, the pillar front flange 28 and the pillar rear flange 29.

Figure 10:
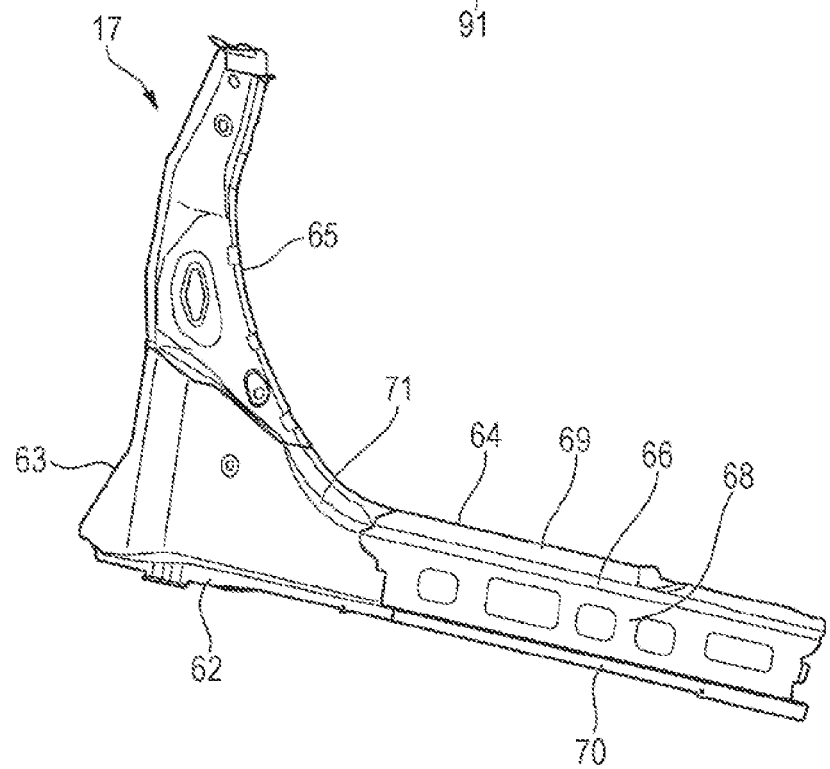
FIG. 10 is a perspective view of an inner panel of a vehicle body side structure according to an embodiment of the present disclosure as seen from an upper inside in a vehicle width direction.

As shown in FIGS. 2 and 10, the inner protrusion 61 of the inner panel 17 includes an inner lower flange 62 which is backwardly continuous from the side sill outer lower flange 26 and an inner rear flange 63 which is downwardly continuous from the pillar rear flange 29. The inner panel 17 includes a side sill inner part 64 which extends in the vehicle body front-back direction and a center pillar inner part 65 which forms part of a vertical edge of a door opening.

As shown in FIGS. 7 and 10, the side sill inner part 64 includes a side sill inner upper wall 66, a side sill inner lower wall 67, a side sill inner side wall 68, side sill inner upper flange 69 and a side sill inner lower flange 70. The side sill inner side wall 68 connects vehicle-width inner ends of the side sill inner upper wall 66 and the side sill inner lower wall 67. The side sill inner upper flange 69 extends upward from a vehicle-width outer end of the side sill inner upper wall 66. The side sill inner lower flange 70 extends downward from a vehicle-width outer end of the side sill inner lower wall 67. The side sill inner part 64 has a cross section of a hat-like shape formed by the side sill inner upper wall 66, the side sill inner lower wall 67, the side sill inner side wall 68, the side sill inner upper flange 69 and the side sill inner lower flange 70. The center pillar inner part 65 is formed in a plate shape. The side sill inner upper wall 66 has a gradually changing part 71 having a width in the vehicle width direction which gradually decreases toward the center pillar inner part 65.

As shown in FIG. 7, the side sill outer upper flange 25 and the side sill inner upper flange 69 hold an upper end of the stiffener 19 from both sides in the vehicle width direction. The side sill outer upper flange 25, the upper end of the stiffener 19 and the side sill inner upper flange 69 are overlapped each other and bonded together. As shown in FIG. 7, the side sill outer lower flange 26 and the side sill inner lower flange 70 hold the lower end of the stiffener 19 from both sides in the vehicle width direction. The side sill outer lower flange 26, the lower end of the stiffener 19 and the side sill inner lower flange 70 are overlapped each other and bonded together.

Figure 11:
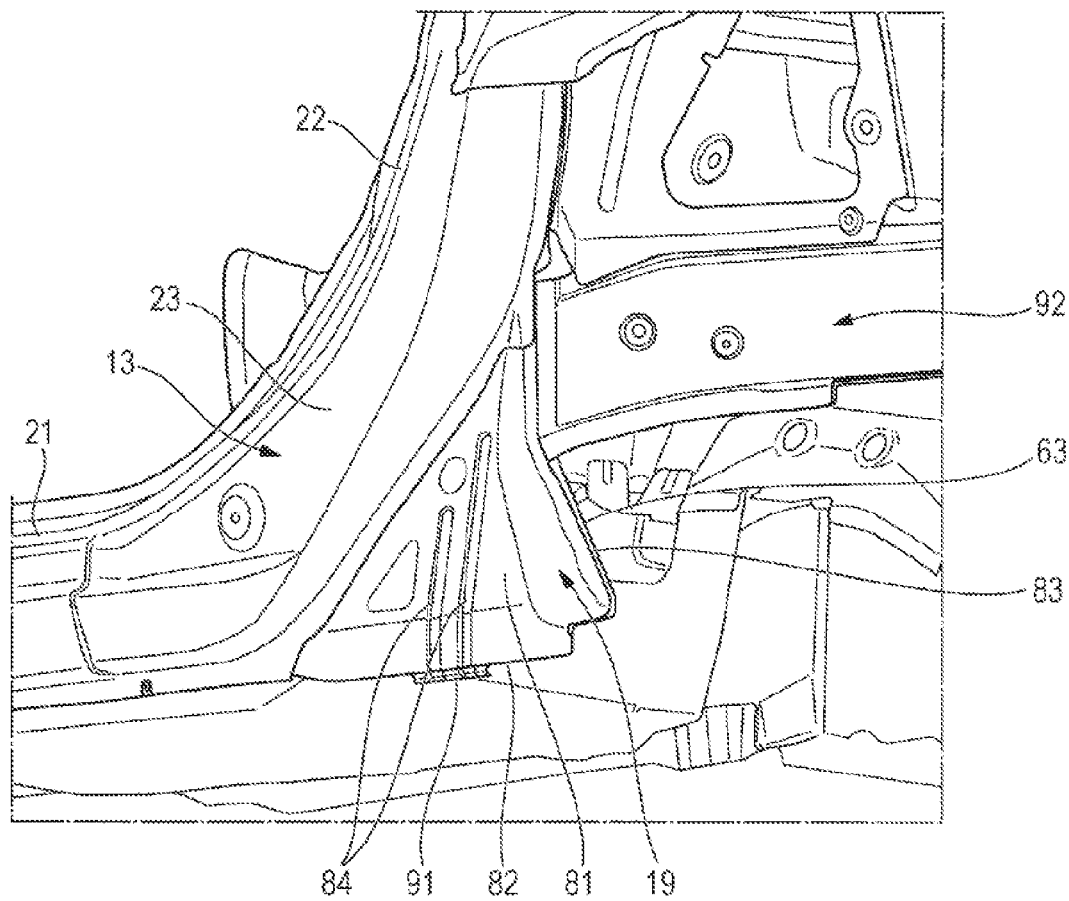
FIG. 11 is a perspective view of a vehicle body side structure according to an embodiment of the present disclosure as seen in the XI direction of FIG. 3 (from a lower outside in a vehicle width direction).

As shown in FIG. 2, the stiffener protrusion 81 includes a stiffener lower flange 82 which is backwardly continuous from the side sill outer lower flange 26 and a stiffener rear flange 83 which is downwardly continuous from the pillar rear flange 29. As shown in FIG. 11, the inner rear flange 63 and the stiffener rear flange 83 are overlapped each other and joined to a rear vehicle body frame 92.

Figure 9:
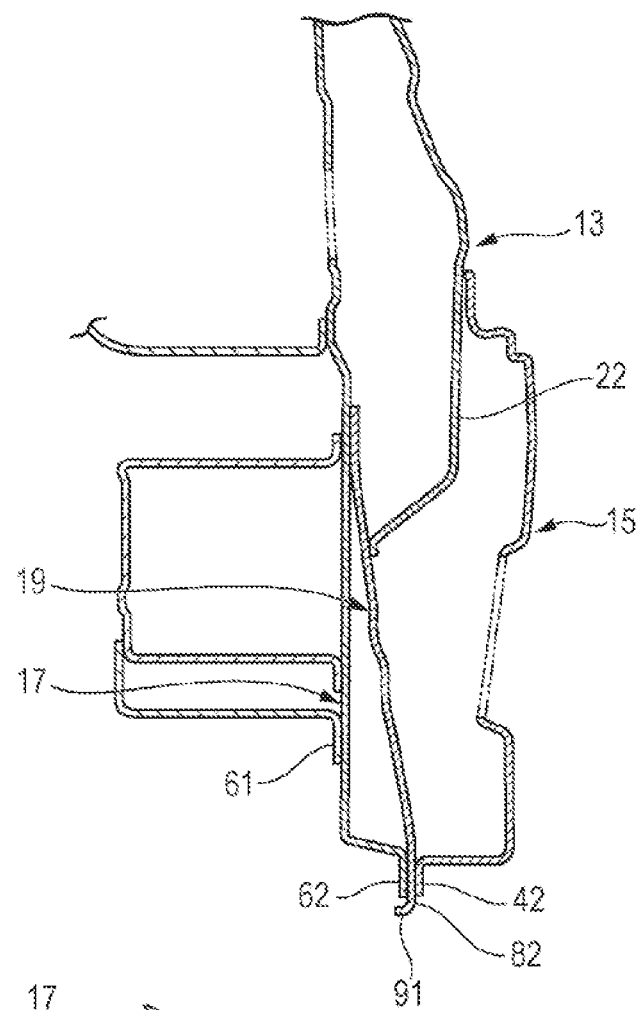
FIG. 9 is a cross sectional view taken along the line IX-IX of FIG. 3.
Figure 12:
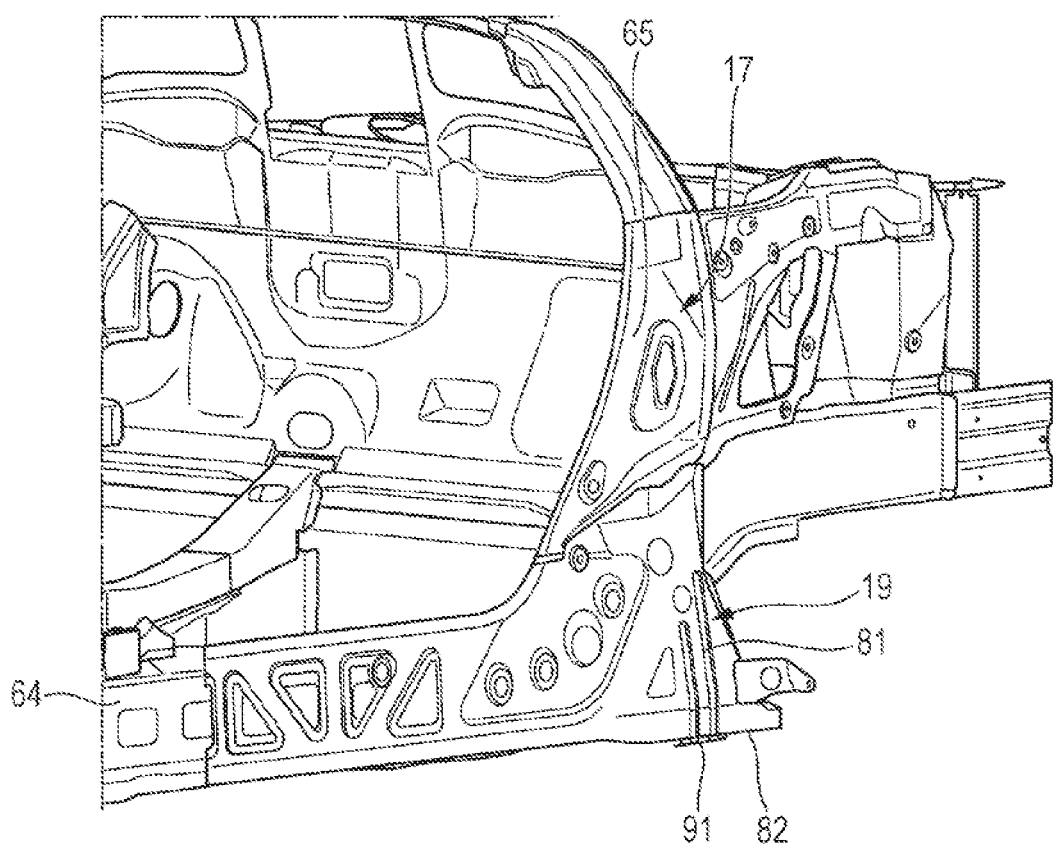
FIG. 12 is a perspective view of a vehicle body side structure according to an embodiment of the present disclosure as seen from a front outside in a vehicle width direction without showing a rear fender and an outer panel.

The rear fender 15 includes a fender lower flange 42 which is overlapped and joined to the inner lower flange 62 and the stiffener lower flange 82. The inner lower flange 62, the stiffener lower flange 82 and the fender lower flange 42 are overlapped each other and joined together. As shown in FIGS. 9 and 11, a jack-up part 91 is disposed in a portion in which the inner lower flange 62, the stiffener lower flange 82 and the fender lower flange 42 are overlapped each other. As shown in FIGS. 11 and 12, the stiffener protrusion 81 includes two beads 84 which extend upward from the jack-up part 91. The stiffener 19 forms a flat surface which is continuous from the plate-shaped center pillar inner part 65, and is joined to a vehicle-width outside of the side sill inner part 64 and forms a closed cross section.

Figure 13:
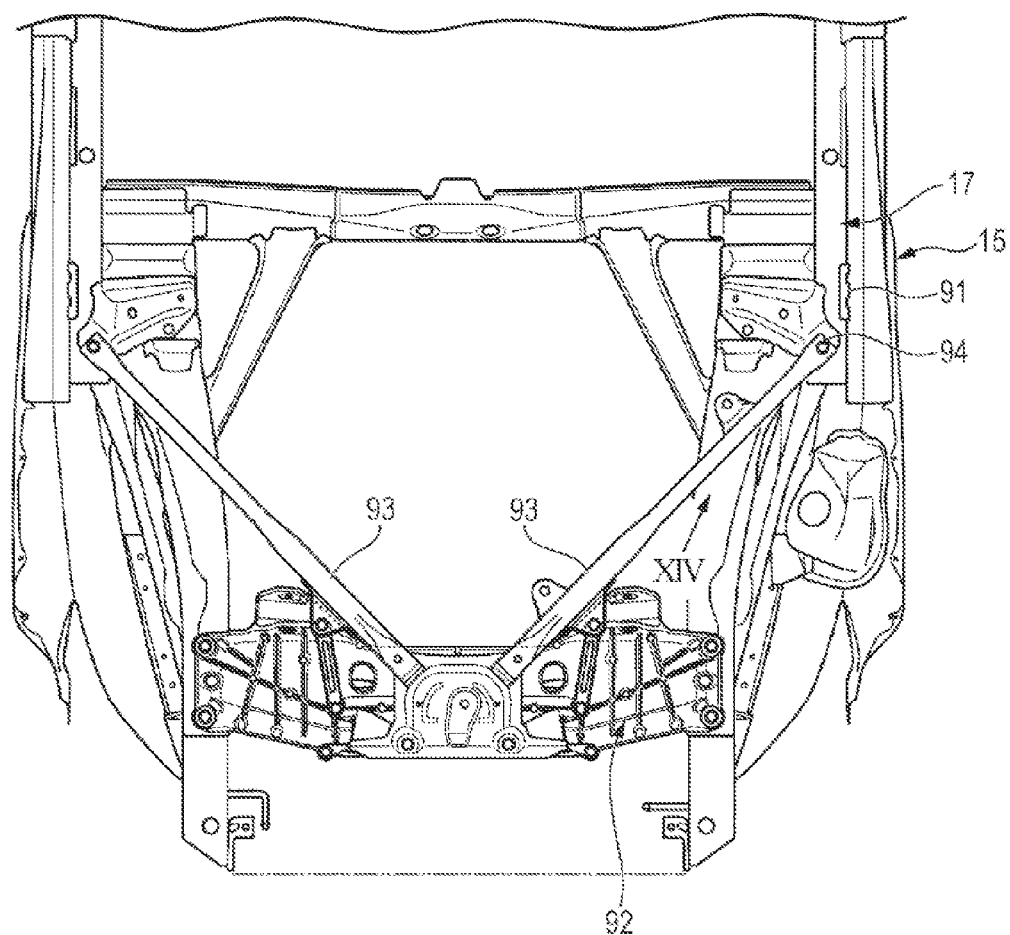
FIG. 13 is a bottom view of a vehicle body side structure according to an embodiment of the present disclosure as seen from a lower position in a vehicle body up-down direction.
Figure 14:
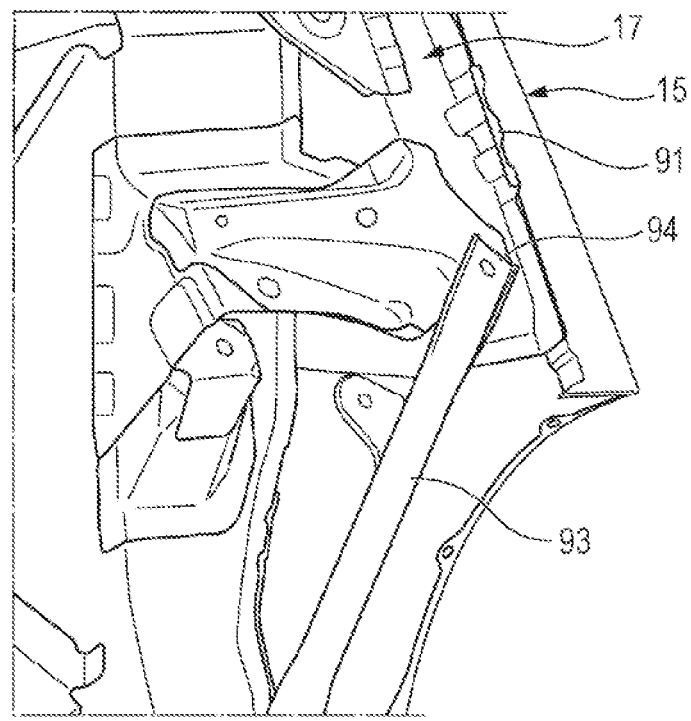
FIG. 14 is a perspective view of a vehicle body side structure according to an embodiment of the present disclosure as seen in the XIV direction of FIG. 13 (from a lower inside in a vehicle width direction).

As shown in FIGS. 13 and 14, the vehicle body side structure 10 includes a pair of braces 93 which extends forward from the rear vehicle body frame 92 which is disposed on a rear side of the jack-up part 91. The respective rear ends of the braces 93 are fastened to a center portion in the vehicle width direction of the rear vehicle body frame 92. The respective front ends 94 of the braces 93 are mounted on the rear ends of the right and left inner panels 17 in the vicinity of the jack-up part 91.

As described above, according to the vehicle body side structure 10 of this embodiment, even in a vehicle of a design in which the center pillar is inclined backward, the lower end 41 of the rear fender 15 can be joined to the inner panel 17 and the stiffener 19, thereby improving the strength and rigidity of the rear fender 15. Further, there is no need of providing a special part for joining the rear fender 15 to the outer panel 13. Accordingly, even if the outer panel 13 is formed by, for example, a thick and high-strength steel sheet, the outer panel 13 may keep a good formability and prevent from being increased in weight due to increased surface area. Since the lower end 41 of the rear fender 15 is joined to the inner protrusion 61 and the stiffener protrusion 81, three members are connected together as a whole, thereby improving the strength and rigidity of the rear fender 15.

Since the jack-up part 91 is disposed at a position in which the inner lower flange 62, the stiffener lower flange 82 and the fender lower flange 42 are overlapped, the strength and rigidity to an applied load during jacking-up can be improved. Moreover, since the stiffener protrusion 81 includes the beads 84, the strength and rigidity to an applied load during jacking-up can be further improved. Further, since the load from the rear vehicle body frame 92 can be transmitted to a vicinity of the jack-up part 91 via a brace 93, vehicle body rigidity can be improved. Moreover, since the load applied to the jack-up part 91 can be transmitted to the rear vehicle body frame 92 via the brace 93, the strength and rigidity to an applied load during jacking-up can be further improved.

Since the center pillar inner part 65 having a plate shape is provided, the load in the front-back direction and up-down direction can be transmitted along the surface of the plate shape, thereby improving load transmission efficiency and improving the rigidity and strength of vehicle body. Moreover, since the side sill inner part 64 has a cross section of a hat-like shape, the closed cross section formed by combining the side sill inner part 64 and the side sill outer part 21 can be increased, thereby improving the rigidity and strength of a side sill as a whole formed by combining the side sill inner part 64 and the side sill outer part 21 can be improved.

Since the side sill inner upper wall 66 includes the gradually changing part 71, the center pillar inner part 65 and the side sill inner part 64 having different cross sectional shapes can be connected smooth to eliminate a stress concentrated portion, thereby improving load transmission efficiency. Further, instead of having the side sill inner part 64 with a hat-like cross sectional shape, the stiffener 19 can form a flat surface which is continuous to the center pillar inner part 65 so that the load can be transmitted from the center pillar inner part 65 to the flat surface in the front-back direction and up-down direction. Accordingly, the rigidity and strength of vehicle body can be improved by increasing load transmission efficiency.

The embodiments described herein are provided for illustrative purpose and are not intended to limit the scope of the accompanying claims. Those embodiments can be carried out in a variety of forms, and various omission, replacement and modification are possible without departing from the principle of the disclosure. Those embodiments and their variations are included in the scope and principle of the disclosure as defined in the appended claims and their equivalent.

We claim:
1. A vehicle body side structure comprising:
an outer panel that constitutes a design surface of a vehicle body side part and includes a side sill outer part and a center pillar outer part;
a rear fender that constitutes a design surface on a rear side of the outer panel and is disposed to overlap the outside of the side sill outer part and the center pillar outer part such that a front side edge of the center pillar outer part is exposed from the rear fender; and
an indoor panel which is connected to an inner side of the outer panel, the inner side being located on a vehicle cabin side of the outer panel, wherein
the center pillar outer part includes an inclined part which is inclined backward and upward,
the indoor panel includes a protrusion that protrudes backward and downward from the inclined part, and
a lower end of the rear fender is joined to the protrusion of the indoor panel.

2. The vehicle body side structure according to claim 1, wherein
the indoor panel includes an inner panel which is connected to the inner side of the outer panel so as to form a closed cross section, and a stiffener which is interposed between the outer panel and the inner panel and partitions the closed cross section, the protrusion includes an inner protrusion provided to the inner panel and a stiffener protrusion provided to the stiffener, and
the lower end of the rear fender is joined to the inner protrusion and the stiffener protrusion.

3. The vehicle body side structure according to claim 2, wherein
the side sill outer part has a cross section of a hat shape including a side sill outer cross sectional U-shaped part, a side sill outer upper flange which extends upward from the side sill outer cross sectional U-shaped part and a side sill outer lower flange which extends downward from the side sill outer cross sectional U-shaped part,
the center pillar outer part has a cross section of a hat shape including a pillar cross sectional U-shaped part, a pillar front flange which extends forward from the pillar cross sectional U-shaped part and a pillar rear flange which extends backward from the pillar cross sectional U-shaped part,
the inner protrusion includes an inner lower flange which is backwardly continuous from the side sill outer lower flange and an inner rear flange which is downwardly continuous from the pillar rear flange,
the stiffener protrusion includes a stiffener lower flange which is backwardly continuous from the side sill outer lower flange and a stiffener rear flange which is downwardly continuous from the pillar rear flange,
the rear fender includes a fender lower flange which is overlapped and joined to the inner lower flange and the stiffener lower flange, and
a jack-up part is provided in a portion in which the inner lower flange, the stiffener lower flange and the fender lower flange are overlapped each other.

4. The vehicle body side structure according to claim 3, wherein the stiffener protrusion includes a bead which extend upward from the jack-up part.

5. The vehicle body side structure according to claim 3, further comprising a pair of braces which extends forward from a rear vehicle body frame which is disposed on a rear side of the jack-up part, wherein
a front end of each of the braces is mounted in the vicinity of the jack-up part.

6. The vehicle body side structure according to claim 1, wherein
the indoor panel includes an inner panel that is connected to the inner side of the outer panel so as to form a closed cross section,
the inner panel includes a side sill inner part and a center pillar inner part,
the center pillar inner part has a plate shape,
the side sill inner part has a hat shape cross section including:
a side sill inner upper wall and a side sill inner lower wall which oppose to each other,
a side sill inner side wall which connects inner ends in a vehicle width direction of the side sill inner upper wall and the side sill inner lower wall,
a side sill inner upper flange which extends upward from an outer end of the side sill inner upper wall, and a side sill inner lower flange which extends downward from an outer end of the side sill inner lower wall, and
the side sill inner upper wall includes a gradually changing part having a width in a vehicle width direction which gradually decreases toward the center pillar inner part.

7. The vehicle body side structure according to claim 6, further comprising a stiffener which is interposed between the outer panel and the inner panel and partitions the closed cross section, wherein
the stiffener constitutes a flat surface which is continuous from the plate shape of the center pillar inner part and is joined to an outer side of the side sill inner part in the vehicle width direction to form a closed cross section.

8. The vehicle body side structure according to claim 7, wherein the protrusion of the indoor panel protrudes backward and downward from a rear edge of the inclined part.

9. The vehicle body side structure according to claim 6, wherein the center pillar inner part is disposed at a rear of the side sill inner part.

10. The vehicle body side structure according to claim 1, wherein the lower end of the rear fender is joined to the protrusion of the indoor panel without overlapping the outer panel.

11. A vehicle comprising the vehicle body side structure according to claim 1.

* * * * *